United States Patent
Ling

(10) Patent No.: US 9,668,147 B2
(45) Date of Patent: May 30, 2017

(54) AUTOCONFIGURED BACKHAUL TRANSCEIVER

(71) Applicant: MaxLinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

(21) Appl. No.: 14/602,809

(22) Filed: Jan. 22, 2015

(65) Prior Publication Data

US 2015/0215854 A1 Jul. 30, 2015

Related U.S. Application Data

(60) Provisional application No. 61/930,005, filed on Jan. 22, 2014.

(51) Int. Cl.
| | | |
|---|---|---|
| *H04W 24/02* | (2009.01) | |
| *H04W 16/28* | (2009.01) | |
| *H04W 92/12* | (2009.01) | |
| *H04W 84/04* | (2009.01) | |

(52) U.S. Cl.
CPC ............ *H04W 24/02* (2013.01); *H04W 16/28* (2013.01); *H04W 84/045* (2013.01); *H04W 92/12* (2013.01)

(58) Field of Classification Search
CPC ... H04W 48/16; H04W 64/003; H04W 24/10; H04W 88/08; H04W 24/02; H04W 92/19; H04W 84/045
See application file for complete search history.

(56) References Cited

U.S. PATENT DOCUMENTS

| | | |
|---|---|---|
| 4,675,880 A | 6/1987 | Davarian |
| 6,005,640 A | 12/1999 | Strolle |
| 7,620,112 B2 | 11/2009 | Tang |
| 8,416,836 B2 | 4/2013 | Kirshenbaum |
| 8,989,762 B1 | 3/2015 | Negus |
| 2003/0032424 A1* | 2/2003 | Judd et al. .................... 455/426 |
| 2005/0136980 A1* | 6/2005 | Kim et al. ................. 455/562.1 |
| 2007/0147485 A1 | 6/2007 | Sakamoto |
| 2008/0233879 A1 | 9/2008 | Sasaki |
| 2008/0274732 A1 | 11/2008 | Boutigny |
| 2009/0023462 A1* | 1/2009 | Dent .......................... 455/456.5 |
| 2009/0207945 A1 | 8/2009 | Sasaki |
| 2010/0240327 A1* | 9/2010 | Lambrecht et al. ............ 455/95 |
| 2012/0155887 A1 | 6/2012 | Youn |

(Continued)

*Primary Examiner* — Brandon Miller
(74) *Attorney, Agent, or Firm* — McAndrews, Held & Malloy, Ltd.

(57) ABSTRACT

A microwave transceiver comprises a plurality of antenna arrays, each of which is oriented in a different direction, and circuitry operable to automatically select which of the antenna arrays to use for establishing a microwave backhaul link with a link partner. The circuitry may comprise a plurality of front-ends, each of which may be operable to perform beamforming of signals transmitted and received via a respective one of the antenna arrays. The circuitry may comprise a modem circuit. For transmit operations, the modem may generate a modulated signal for output to one of the plurality of front-end circuits. For receive operations, the modem may demodulate a signal received from one of the plurality of front-end circuits. Each of the antenna arrays may be mounted to a different one of a plurality of surfaces of a housing of the microwave transceiver. The housing of the microwave transceiver may form a polyhedron.

18 Claims, 5 Drawing Sheets

(56) References Cited

U.S. PATENT DOCUMENTS

| | | | |
|---|---|---|---|
| 2012/0207048 A1 | 8/2012 | Kim | |
| 2013/0089042 A1* | 4/2013 | Negus | H04B 7/0691 370/329 |
| 2013/0229309 A1 | 9/2013 | Thomas | |
| 2013/0321225 A1* | 12/2013 | Pettus | H01Q 3/08 343/765 |
| 2014/0003332 A1* | 1/2014 | Bennett | H04W 24/04 370/328 |
| 2014/0031072 A1 | 1/2014 | Koorapaty | |
| 2014/0347222 A1* | 11/2014 | Ling | 342/373 |
| 2014/0370936 A1* | 12/2014 | Ling | 455/562.1 |
| 2015/0188584 A1 | 7/2015 | Laurent-Michel | |
| 2015/0188585 A1* | 7/2015 | Laurent-Michel et al. | H04B 1/1081 |
| 2015/0215853 A1* | 7/2015 | Ling | H04W 64/003 370/254 |
| 2015/0230105 A1 | 8/2015 | Negus | |
| 2016/0007273 A1* | 1/2016 | Farid | H04W 48/16 370/329 |
| 2016/0173149 A1* | 6/2016 | Ling | H01Q 3/40 375/346 |

\* cited by examiner

AUTOCONFIGURED BACKHAUL TRANSCEIVER

PRIORITY CLAIM

This application claims priority to the following application(s), each of which is hereby incorporated herein by reference:
U.S. provisional patent application 61/930,005 titled "Autoconfigured Backhaul Transceiver" filed on Jan. 22, 2014.

INCORPORATION BY REFERENCE

The entirety of each of the following applications is hereby incorporated herein by reference:
U.S. patent application Ser. No. 14/602,786 titled "Network Discovery in an Autoconfigured Backhaul Transceiver" filed concurrently with this application, now published as US-2015-0215853.

BACKGROUND

Conventional methods and systems for backhauling small cell basestations are too costly to install and maintain. Further limitations and disadvantages of conventional and traditional approaches will become apparent to one of skill in the art, through comparison of such systems with some aspects of the present invention as set forth in the remainder of the present application with reference to the drawings.

BRIEF SUMMARY

Systems and/or methods are provided for autoconfigured backhaul transceiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

Figure 1:
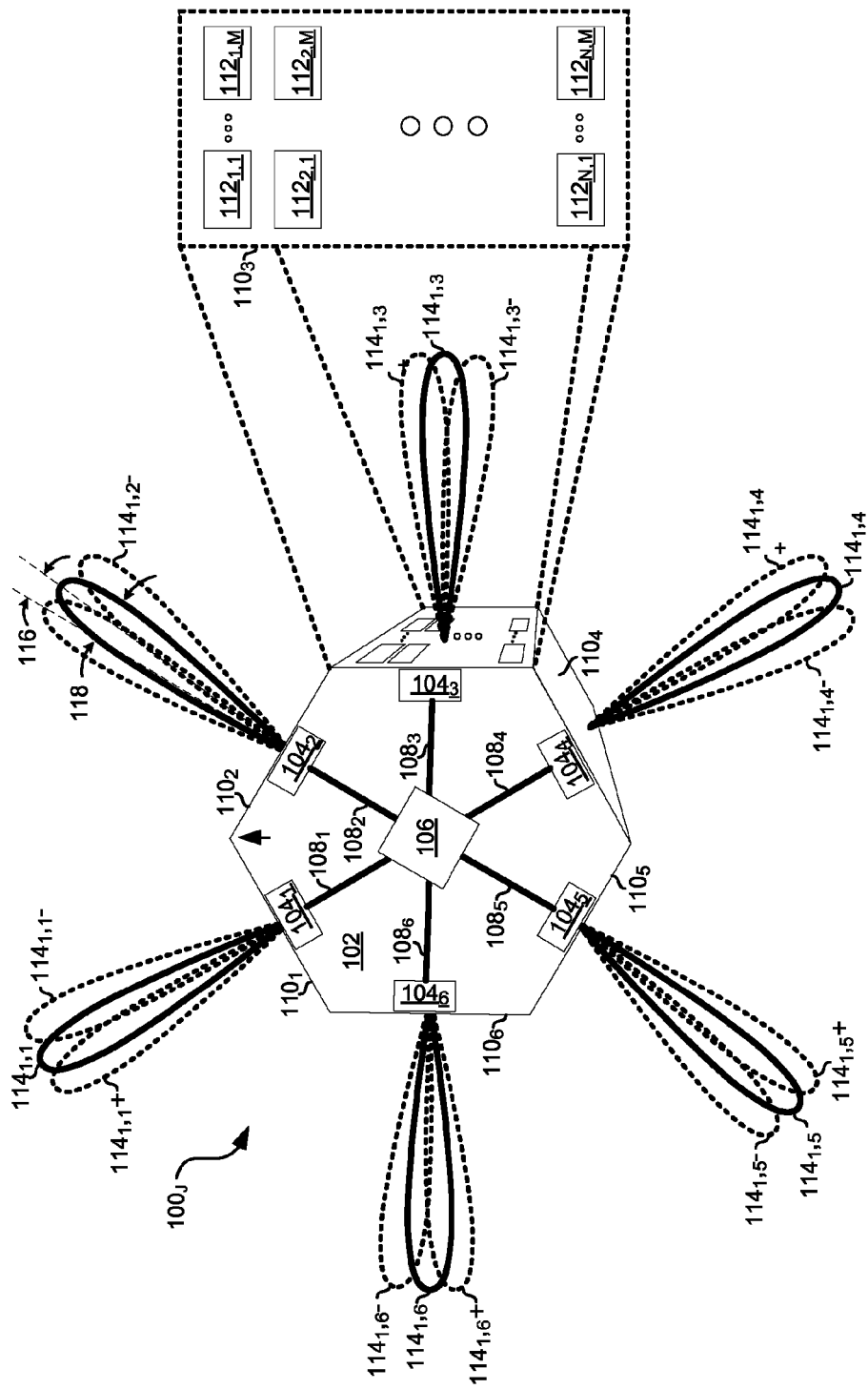
FIG. 1 depicts an autoconfigured small cell backhaul transceiver, in accordance with an example, implementation of this disclosure.

FIG. 1 is a diagram illustrating an autoconfigured small cell backhaul transceiver, in accordance with an implementation of this disclosure. The depicted small cell backhaul transceiver $100_j$ comprises structural elements 102, a plurality of antenna arrays 110 and corresponding phased-array transceiver front-ends 104, a modem 106, and bus(es) 108.

The structural elements 102 may comprise, for example, one or more printed circuit boards and a plastic or metal housing arranged as a sphere or polyhedron, for example. As a non-limiting example, the small cell backhaul transceiver $100_j$ is depicted as an octahedron in FIG. 1.

The traces (e.g., microstrip or stripline) or cable (e.g., copper or optical) $108_1$-$108_K$ form one or more data busses via which the modem 106 sends data to, and receives data from, the front-ends 104. In an example implementation each trace $108_k$ is a dedicated serial bus. In another example implementation, the traces $108_1$-$108_K$ are electrically coupled and form a single high-speed serial bus.

Each array $110_k$ (k between 1 and 6 for the example shown in FIG. 1) comprises an array of M (an integer) times N (an integer) antenna elements 112. In the example depicted, the elements 112 are in a regular two-dimensional array with each element indexed by row and column ($112_{2,1}$ is in row 2 and column 1 of the array 110). In other implementations, the array elements 112 may be irregularly spaced/arranged and/or arranged in three-dimensions. Each antenna element $112_{n,m}$ may be, for example, a microstrip patch.

The modem circuit 106 is operable to perform modulation functions such as, for example, bit-to-symbol mapping, interleaving, forward error correction encoding. The modem circuit 106 is operable to perform demodulation functions such as, for example, symbol-to-bit demapping, deinterleaving, forward error correction decoding.

For transmit operations, each front-end subsystem $104_k$ is operable to process a digital baseband signal received from modem 106 via trace or cable $108_k$ for transmitting the signal via the phased-array antenna $110_k$. For receive operations, each front-end subsystem $104_k$ is operable to process an RF signal (e.g., in a licensed and/or ISM microwave band(s)) received via the phased-array antenna $110_k$ to recover a baseband digital signal for communication to the modem 106 via trace $108_k$. The front-end subsystem $104_k$ is operable to control gain and/or amplitude of signals output to each of the elements $112_{1,1}$-$112_{N,M}$ of array $110_k$ to achieve beamforming. The gain and/or amplitude of the signals may be set to compensate for static misalignment between the small cell backhaul transceiver $100_j$ and the link partner with which the small cell backhaul transceiver $100_j$ desires to communicate via array $110_k$. Additionally, or alternatively, the gain and/or amplitude of the signals may be controlled dynamically (i.e., while the signals are being transmitted and/or received via array $110_k$) to compensate for dynamic movement (e.g., due to wind) of the small cell backhaul transceiver $100_j$ and/or of the link partner with which it is communicating via array $110_k$. An example front-end subsystem $104_k$ is described below with reference to FIG. 2.

Figure 2:
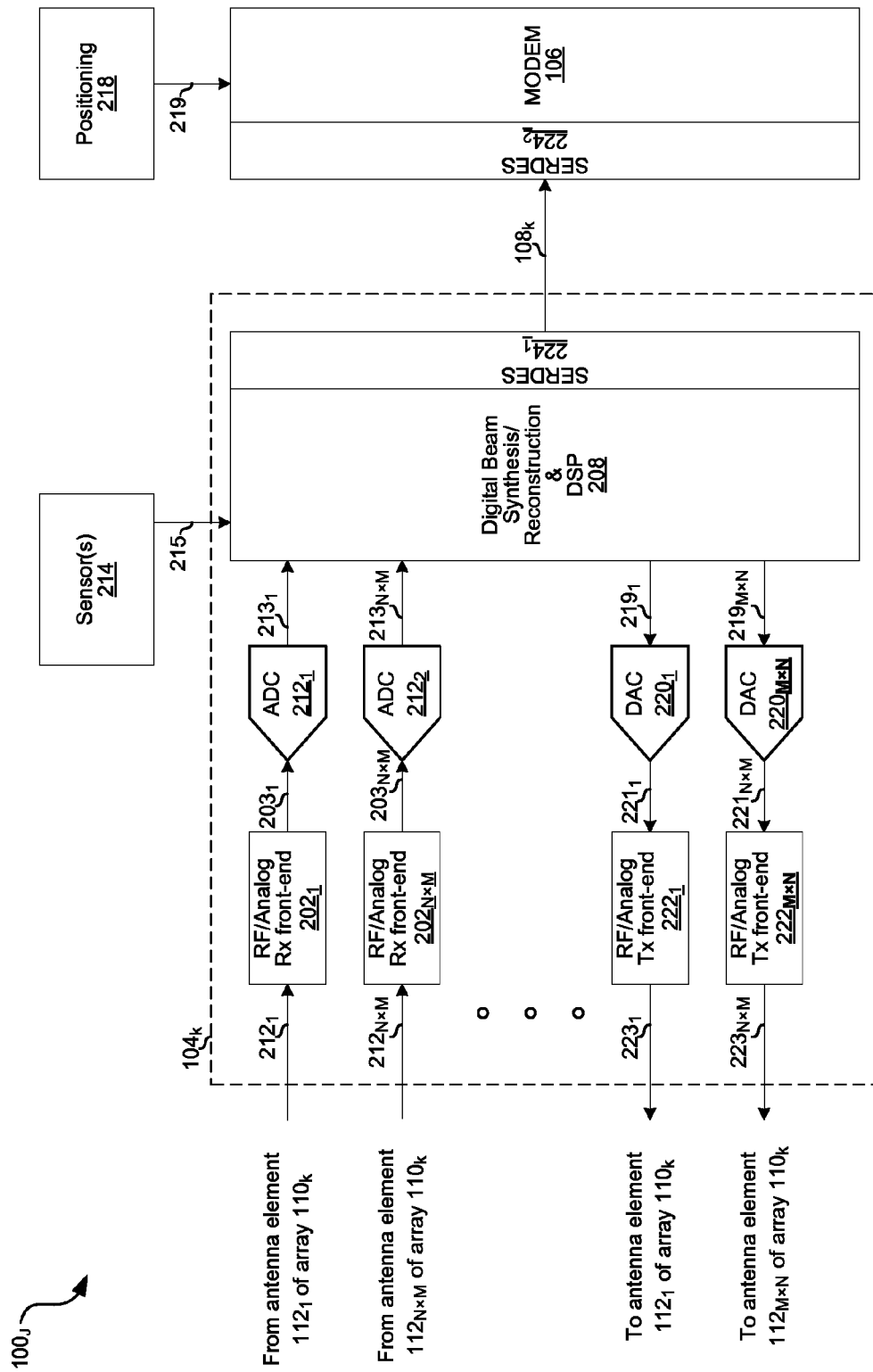
FIG. 2 depicts additional details of the autoconfigured small cell backhaul transceiver of FIG. 1

FIG. 2 depicts additional details of the autoconfigured small cell backhaul transceiver of FIG. 1. In the example small cell backhaul transceiver $100_j$ of FIG. 2, beamforming is performed in the digital domain. In other implementations, beamforming may be performed in the analog domain or in a combination of the analog and digital domains. Components of small cell backhaul transceiver $100_j$ shown in FIG. 2 include sensors 214, positioning circuit 218, modem 106, serializer/deserialzer (SERDES) circuits $224_1$ and $224_2$, and front-end subsystem $104_k$. The front-end subsystem $104_k$ comprises receiver front-end circuits $202_1$-$202_{M \times N}$, analog-to-digital converters (ADCs) $212_1$-$212_{M \times N}$, transmitter front-end circuits $222_1$-$222_{M \times N}$, digital-to-analog converters ($220_1$-$220_{M \times N}$), and digital signal processing circuit 208.

The sensor(s) 214 may comprise, for example, a gyroscope, accelerometer, compass, and/or the like. The sensor(s) 214 may be operable to detect an orientation of the small cell backhaul transceiver $100_j$, movement of the small cell backhaul transceiver $100_j$, wind load on the ODU 102, and/or the like. The sensor(s) 214 may output readings/measurements as signal 215.

The positioning circuit 218 may comprise, for example, a GPS receiver or other device operable to determine a location of the small cell backhaul transceiver $100_j$ and convey the position (e.g., GPS coordinates) to other circuitry of the small cell backhaul transceiver $100_j$, such as to DSP 208.

Each receiver front-end circuit $202_n$ ($1 \leq n \leq M \times N$) is operable to receive (e.g., via microstrip, stripline, waveguide, and/or the like) a signal $212_n$ from a respective antenna element $116_n$. Each front-end circuit 202 processes the signal $212_n$ by, for example, amplifying it (e.g., via a low noise amplifier LNA), filtering it, and/or down-converting it to an intermediate frequency or to baseband. The result of the processing performed by each circuit $202_n$ is a signal $203_n$.

Each ADC $212_n$ is operable to digitize signal $203_n$ o generate signal $213_n$. The bandwidth of the ADC $212_n$ may be sufficient such that it can concurrently digitize the entire microwave band of interest (e.g., 500 MHz in the 60 GHz ISM band or 1 GHz or more for E-band channels).

Each DAC $220_n$ is operable to convert digital signal $219_n$ to analog signal $221_n$. The bandwidth of the DAC $220_n$ may be sufficient such that it can concurrently convert the entire microwave band of interest (e.g., 500 MHz in the 60 GHz ISM band or 1 GHz or more for E-band channels).

For reception, the DSP circuit 208 processes received digital signals $213_1$-$213_{M \times N}$ to generate a signal for output to the SERDES $224_1$. The processing may include performing functions such as: beamforming, interference cancellation (e.g., cross-polarization interference), I/Q mismatch calibration, channelization (to select the television stations, MPEG streams, etc. that are being requested by the IDU, band/channel translation, and/or band/channel stacking. The beamforming may comprise a weighted combining of the signals $213_1$-$213_{M \times N}$, where the weights are phase and/or amplitude coefficients calculated to achieve a desired receive antenna pattern.

For transmission, the DSP circuit 208 is operable to process signals received from the SERDES $224_1$ to generate the signals $219_1$-$219_{M \times N}$. The processing may include, for example, digital predistortion and beamforming. The beamforming may comprise generating M×N phase and/or amplitude weighted versions of a baseband signal to be transmitted and then outputting the M×N signals as signals $219_1$-$219_{M \times N}$.

The phase and amplitude coefficients for transmission and/or reception may be controlled dynamically (i.e., concurrently with the small cell backhaul transceiver $100_j$ transmitting and/or receiving via one or more of its arrays $110_0$-$110_K$ and corresponding subsystems $104_0$-$104_K$). The coefficients, and thus the antenna patterns, may be controlled based on the measurements/readings from the sensor(s) 214. The coefficients, and thus the antenna pattern(s), may be controlled to compensate for static misalignment (e.g., introduced during installation or subsequently as a result of wind, getting hit by on object, etc.) and/or dynamic misalignment (e.g., twist and sway that comes and goes with the wind).

Referring back to FIG. 1, in the example hexagonal/octahedral small cell backhaul transceiver $100_j$ shown, each front-end subsystem $104_k$ of the small cell backhaul transceiver $100_j$ is operable to generate a beam 114 having a 3 dB beamwidth 118 (e.g., 10°). In the example implementation shown, each beam $114_{j,k}$ may be steered an amount 116 (e.g., plus or minus 30°) in the azimuthal direction, thus enabling the six beams to cover the full 360°. Each lobe in its centered position is called out as $114_{j,k}$, steered to +30° is called out as $114_{j,k}+$, and steered to −30° is called out as $114_{j,k}-$. Additionally, one or more arrays $110_k$ that comprise a multidimensional array of elements may also be steerable in elevation (e.g., also plus or minus 30°).

Referring to FIGS. 1 and 2, small cell backhaul transceiver $100_j$ may be realized on any combination of one or more semiconductor (e.g., Silicon, GaAs) dies and/or one or more printed circuit boards residing in one or more enclosures/housings. As just one non-limiting example, each circuit $202_n$ may comprise one or more first semiconductor dies located as close as possible to (e.g., a few centimeters from) its respective antenna element $112_n$, the circuits 212, 208, and $224_1$ may comprise one or more second semiconductor dies on the same PCB as the first die(s), the circuits $224_2$ and 106 may reside on one or more third semiconductor dies on the same PCB, and the sensor(s) 214 may be discrete components connected to the PCB via wires or wirelessly.

Figure 3:
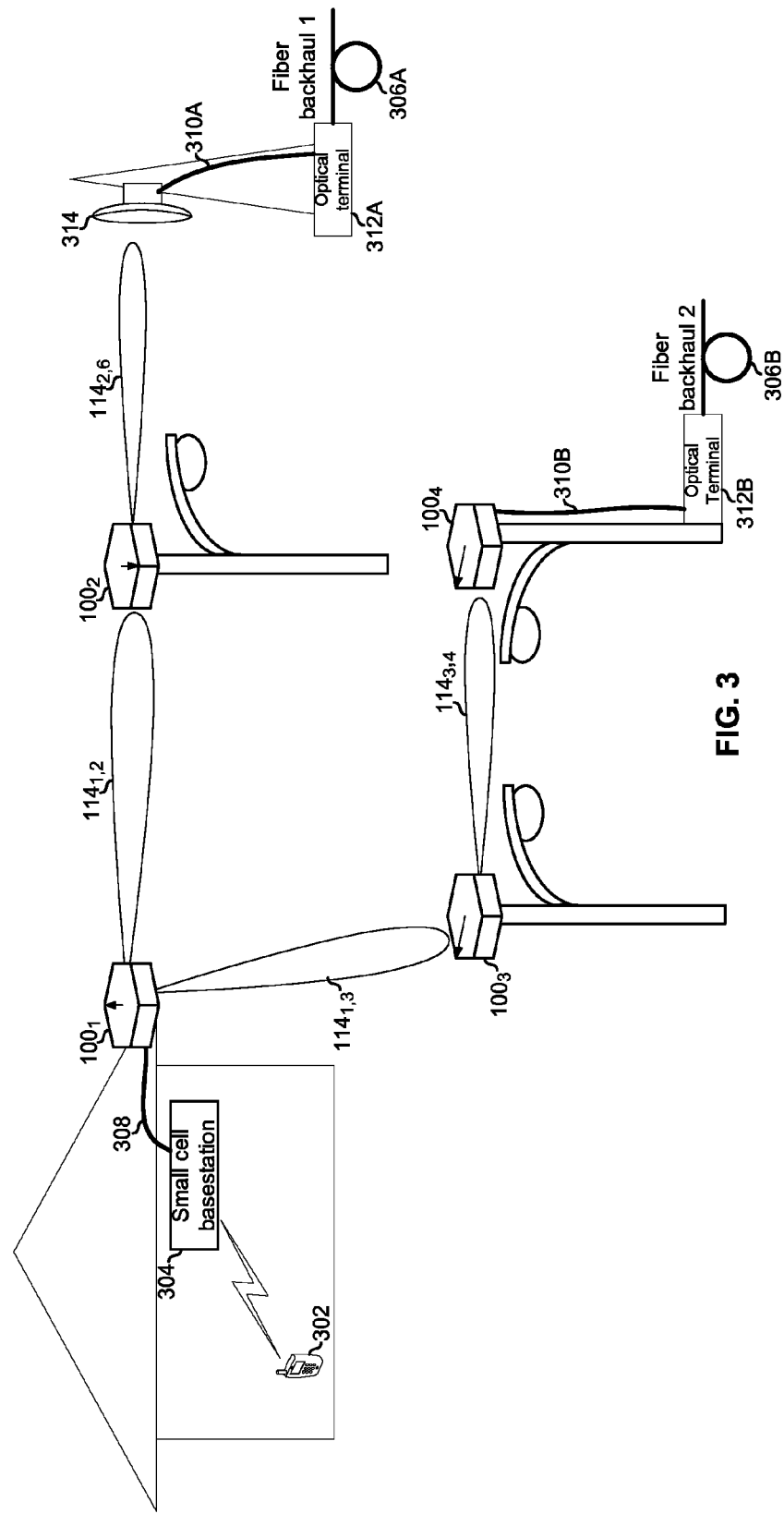
FIG. 3 depicts an example network comprising a plurality of instances of the small cell backhaul transceiver of FIG. 1.

FIG. 3 depicts an example network comprising a plurality of instances of the small cell backhaul transceiver of FIG. 1. In the example network, there are four instances of small cell backhaul transceiver $100_j$. The small cell backhaul transceiver $100_1$ is mounted to a building (e.g., a residence or commercial building) and each small cell backhaul transceiver $100_j$ ($2 \leq j \leq 4$, in the example shown) is mounted to a light pole (as an example, in practice they could be mounted anywhere). Also shown are a small cell basestation 304, a mobile device 302, a conventional microwave tower 314, optical terminals 312A and 312B, and fiber backhaul links 306A and 306. The arrows on the small cell backhaul transceivers $100_j$ indicate their respective azimuthal orientation (referenced to FIG. 1). In an example implementation, the azimuthal orientations may effectively be random as this may facilitate quick and easy installation (e.g., simply plugging small cell backhaul transceiver 100 into a preexisting light socket or outlet). That is, a rough alignment achieved by visual inspection, without precise instrumentation, may be sufficient since the combination of multiple arrays and ability to beam steer can compensate for misalignment in the azimuthal angle and/or angle of elevation.

The small cell backhaul transceiver $100_1$ is connected to small cell basestation 304 via link 308 (although a wired or optical link is shown, link 308 could be wireless). The small cell backhaul transceiver $100_4$ is connected to fiber backhaul 306B via link 310B (wired, wireless, or optical) and optical terminal 312B. The microwave tower 314 connects to fiber backhaul 306A via link 310A and optical terminal 312A.

In the example network shown, the small cell backhaul transceivers $100_1$-$100_4$ have automatically configured themselves to generate the depicted beams $114_{j,k}$ (for $1 \le j \le 4$ and $1 \le k \le 6$) for backhauling traffic of the small cell basestation 304 to one or both of fiber backhauls 306A and 306B. It is noted that, although only uplink beams are shown for clarity of illustration, the backhaul may concurrently handle bidirectional traffic, or may handle only downstream traffic.

The small cell backhaul transceiver $100_1$ has configured itself to receive data via link 308 and transmit the data to one or both of small cell backhaul transceivers $100_2$ and $100_3$. Small cell backhaul transceiver $100_1$ may, for example, transmit to each concurrently or use one as a primary link and the other as a failover or backup. For transmitting to small cell backhaul transceiver $100_3$, the small cell backhaul transceiver $100_1$ uses its array $110_3$ and front-end subsystem $104_3$. For transmitting to small cell backhaul transceiver $100_3$, the small cell backhaul transceiver $100_1$ uses its array $110_4$ and front-end subsystem $104_4$.

The small cell backhaul transceiver $100_2$ has configured itself to receive data from small cell backhaul transceiver $100_1$ and to transmit the data to microwave tower 314. For receiving from small cell backhaul transceiver $100_1$, the small cell backhaul transceiver $100_2$ uses its array $110_3$ and front-end subsystem $104_3$. For transmitting to tower 314, the small cell backhaul transceiver $100_2$ uses its array $110_6$ and front-end subsystem $104_6$.

The small cell backhaul transceiver $100_3$ has configured itself to receive data from small cell backhaul transceiver $100_1$ to transmit the data to small cell backhaul transceiver $100_4$. For receiving from small cell backhaul transceiver $100_1$, the small cell backhaul transceiver $100_3$ uses its array $110_2$ and front-end subsystem $104_2$. For transmitting to small cell backhaul transceiver $100_4$, the small cell backhaul transceiver $100_2$ uses its array $110_4$ and front-end subsystem $104_4$.

The small cell backhaul transceiver $100_4$ has configured itself to receive data from small cell backhaul transceiver $100_3$ and to transmit the received data to the optical terminal 312B via link 310B. For receiving from small cell backhaul transceiver $100_1$, the small cell backhaul transceiver $100_3$ uses its array $110_1$ and front-end subsystem $104_1$.

Figure 4:
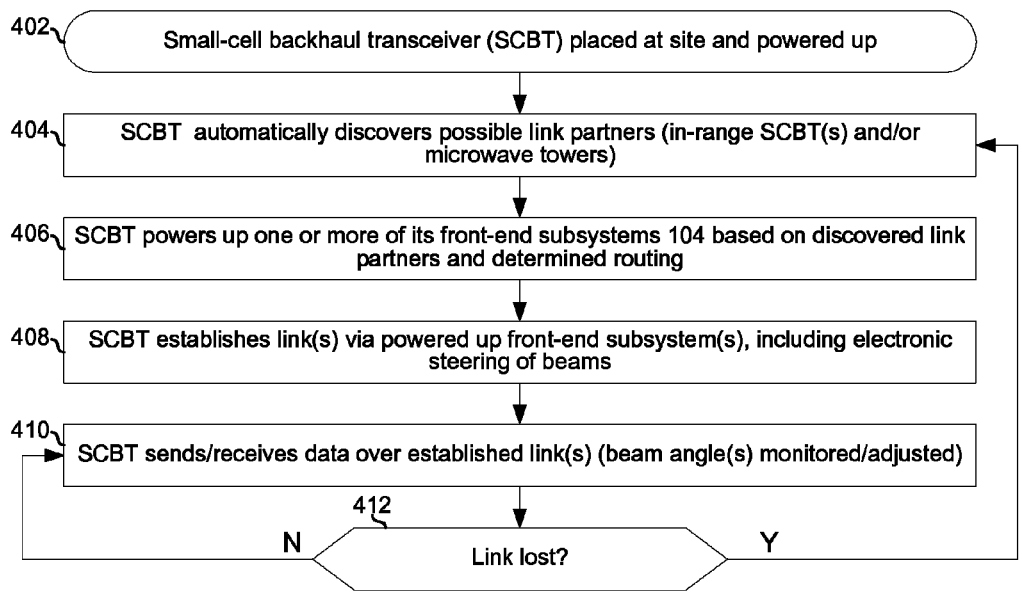
FIG. 4 is a flowchart illustrating an example process for autoconfiguration of the small cell backhaul transceiver of FIG. 1.

FIG. 4 is a flowchart illustrating an example process for autoconfiguration of the small cell backhaul transceiver of FIG. 1. In block 402, a small cell backhaul transceiver 100 is placed at its site of operation and powered up. The site of operation may be, for example, on a light pole, inside a building, on the outside of a building, or the like.

In block 404, the small cell backhaul transceiver 100 automatically discovers possible link partners. That is, the small cell backhaul transceiver 100 discovers other small cell backhaul transceiver(s) and/or conventional microwave towers (e.g., 314) that are within communication range. Example methods for such discovery are described in the above-incorporated U.S. Patent Application titled "Network Discovery in an Autoconfigured Backhaul Transceiver."

In block 406, the small cell backhaul transceiver 100 powers up one or more of its front-end subsystems $104_1$-$104_K$. Which of subsystems $104_1$-$104_K$ are powered up is based on the available link partners discovered in block 404, and based on routing algorithms used for the network of small cell backhaul transceivers and conventional microwave towers.

In block 408, the small cell backhaul transceiver 100 establishes link(s) via the powered-up front-end subsystem(s). Establishing links may comprise electronically scanning azimuthal angles and/or angle of elevation to optimize link performance, where the scanning is achieved by the DSP 208 sweeping over a range of phase and/or amplitude coefficients. In an example implementation, the scan may seek to determine coefficients that maximize SNR for the links being established. In an example implementation, the scan may seek to determine coefficients that achieve at least a threshold SNR for both the link being established and another previously established link. That is, interference with other links may be accounted for when determining the angles at the link is to operate.

In block 410, the small cell backhaul transceiver 100 sends and/or receives data over the links established in block 410. The beam angle(s) may be continually, occasionally, and/or periodically adjusted to maintain a minimum threshold of performance for the given conditions.

In block 412, if it is determined a link has been lost (e.g., due to a physical obstruction or component failure) the process may return to block 404 and the small cell backhaul transceiver 100 may try to establish a new link to replace the lost link.

Figure 5:
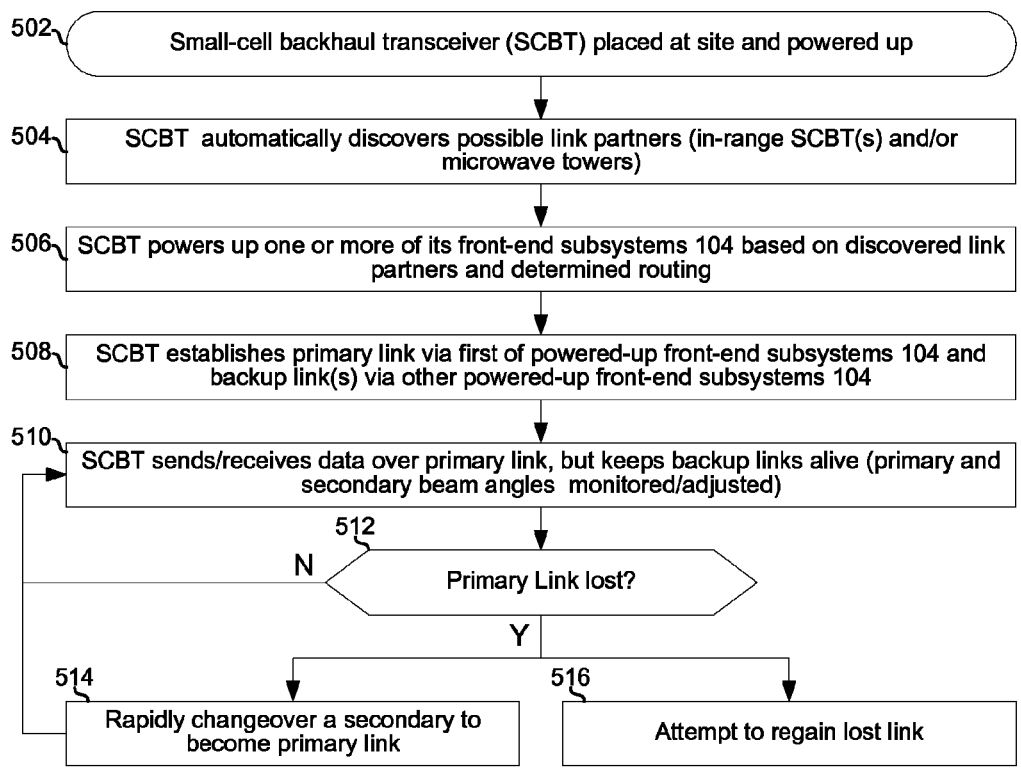
FIG. 5 is a flowchart illustrating an example process for autoconfiguration of the small cell backhaul transceiver of FIG. 1.

FIG. 5 is a flowchart illustrating an example process for autoconfiguration of the small cell backhaul transceiver of FIG. 1. Blocks 502, 504, and 506 are the same as blocks 402, 404, and 406, respectively.

In block 508, the small cell backhaul transceiver 100 establishes a primary link via a first of its front-end subsystems 104 powered up in block 506 and one or more backup link(s) via one or more others of its front-end subsystems 104 powered up in block 506.

In block 510, small cell backhaul transceiver 100 sends/receives data over a primary link established in block 508, but keeps backup links alive. Keeping a link alive may comprise, for example, periodically or occasionally sending training sequences to maintain/adjust timing parameters, filter coefficients, beamforming coefficients, and/or other parameters.

In block 512, if it is determined that the primary link is lost then block 514 and 516 proceed in parallel.

In block 514, small cell backhaul transceiver 100 quickly switches from the failed primary link to one of the secondary links. Because the links have been kept alive, data can resume flowing almost immediately.

In block 516, the small cell backhaul transceiver 100 attempts to repair the lost link.

In accordance with an example implementation of this disclosure, a microwave transceiver (e.g., $100j$) comprises a plurality of antenna arrays (e.g., $112_{1,1}$-$112_{N,M}$), each of which is oriented in a different direction, and circuitry (e.g., $104_1$-$104_6$ and/or and 106) operable to automatically select which of the antenna arrays to use for establishing a microwave backhaul link with a link partner. The circuitry may comprise a plurality of front-end circuits (e.g., $104_1$-$104_6$), each of which may be operable to perform beamforming of signals transmitted and received via a respective one of the antenna arrays. The circuitry may comprise a modem circuit (e.g., 106). For transmit operations, the modem may generate a modulated signal for output to one of the plurality of front-end circuits. For receive operations, the modem may demodulate a signal received from one of the plurality of front-end circuits. Each of the front-end circuits may be coupled to the modem circuit via a serial bus (e.g., $108_1$). Each of the antenna arrays may be mounted to a different one of a plurality of surfaces (e.g., $110_1$-$110_6$) of a housing of the microwave transceiver. The housing of the microwave transceiver may form a polyhedron. The automatic selection of which of the antenna arrays to use for establishing a microwave backhaul link with a link partner may comprise a determination of a location of the link partner. The determination of the location of the link partner may comprise a measurement of signal strength of a signal received via the plurality of antenna arrays. The determination of the location of the link partner may comprise measurement of signal strength of a signal received via a particular one of the plurality of antenna arrays over a plurality of radiation patterns for the particular one of the plurality of antenna arrays.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    a first small-cell microwave backhaul transceiver comprising:
        a plurality of antenna arrays, each of said plurality of antenna arrays oriented in a different direction; and
        circuitry operable to, in response to loss of a microwave backhaul link, automatically:
            listen, using each of a plurality of radiation patterns for each of said plurality of antenna arrays, for beacon signals transmitted by one or more possible link partners, wherein the one or more possible link partners comprises a second small-cell microwave backhaul transceiver and a conventional microwave tower;
            select one of said possible link partners for establishing a new microwave backhaul link based on said beacon signals;
            select which one of said antenna arrays to use for establishing a new microwave backhaul link with said selected one of said possible link partners based on said beacon signals;
            establish said new microwave backhaul link via said selected one of said antenna arrays; and
            dynamically compensate for a misalignment of said selected one of said antenna arrays.

2. The system of claim 1, wherein said circuitry comprises a plurality of front-end circuits, each of said front-end circuits operable to perform beamforming of signals transmitted and received via a respective one of said antenna arrays.

3. The system of claim 2, wherein said circuitry comprises a modem circuit operable to:
    for transmit operations, generate a modulated signal for output to one of said plurality of front-end circuits; and
    for receive operations, demodulate a signal received from one of said plurality of front-end circuits.

4. The system of claim 3, wherein each of said front-end circuits is coupled to said modem circuit via a serial bus.

5. The system of claim 1, wherein each of said antenna arrays is mounted to a different one of a plurality of surfaces of a housing of said microwave transceiver.

6. The system of claim 5, wherein said housing of said microwave transceiver forms a polyhedron.

7. The system of claim 1, wherein said automatic selection of which one of said antenna arrays to use for establishing said new microwave backhaul link with said selected link partner comprises a determination of a location of said selected link partner.

8. The system of claim 7, wherein said determination of said location of said selected link partner comprises a measurement of signal strength of a signal received via said plurality of antenna arrays.

9. The system of claim 7, wherein said determination of said location of said selected link partner comprises measurement of signal strength of a signal received via a particular one of said plurality of antenna arrays over a plurality of radiation patterns for said particular one of said plurality of antenna arrays.

10. A method comprising:
    in a small-cell microwave backhaul transceiver comprising a plurality of antenna arrays, each of said plurality of antenna arrays oriented in a different direction, automatically performing the following in response to loss of a microwave backhaul link:
        scanning, by circuitry of said microwave transceiver, a plurality of radiation patterns to listen for beacon signals from one or more possible link partners that are within communication range, wherein the one or more possible link partners comprises a second small-cell microwave backhaul transceiver and a conventional microwave tower;

selecting, by said circuitry of said microwave transceiver based on beacon signals received during said scanning, one of said possible link partners for establishing a new microwave backhaul link;

automatically selecting, by said circuitry of said microwave transceiver based on said beacon signals received during said scanning, which one of said antenna arrays to use for establishing a new microwave backhaul link with said selected one of said possible link partners;

establishing said new microwave backhaul link via said selected one of said plurality of antenna arrays; and dynamically compensating for a misalignment of said selected one of said plurality of antenna arrays.

11. The method of claim 10, comprising controlling a radiation pattern of each of said antenna arrays with a respective one of a plurality of front-end circuits.

12. The method of claim 11, comprising:

generating, by a modem circuit of said microwave transceiver, a modulated signal for output to one of said plurality of front-end circuits; and demodulating, by said modem circuit of said microwave transceiver, a signal received from one of said plurality of front-end circuits.

13. The method of claim 12, wherein each of said front-end circuits is coupled to said modem circuit via a serial bus.

14. The method of claim 10, wherein each of said antenna arrays is mounted to a different one of a plurality of surfaces of a housing of said microwave transceiver.

15. The method of claim 14, wherein said housing of said microwave transceiver forms a polyhedron.

16. The method of claim 10, wherein said automatic selecting which one of said antenna arrays to use for establishing said new microwave backhaul link with said selected link partner comprises determining a location of said selected link partner.

17. The method of claim 16, wherein said determining said location of said selected link partner comprises measuring signal strength of a signal received via said plurality of antenna arrays.

18. The method of claim 16, wherein said determining said location of said selected link partner comprises measuring signal strength of a signal received via a particular one of said plurality of antenna arrays over a plurality of radiation patterns for said particular one of said plurality of antenna arrays.

* * * * *